United States Patent [19]

Dobias

[11] 4,399,742
[45] Aug. 23, 1983

[54] AIR WASHER PARTICULARLY FOR PAINT SPRAY BOOTHS

[75] Inventor: Frank L. Dobias, Livonia, Mich.

[73] Assignee: Binks Manufacturing Company, Franklin Park, Ill.

[21] Appl. No.: 336,902

[22] Filed: Jan. 4, 1982

Related U.S. Application Data

[60] Continuation of Ser. No. 155,586, Jun. 2, 1980, abandoned, which is a division of Ser. No. 877,005, Feb. 13, 1978, Pat. No. 4,239,512, which is a continuation-in-part of Ser. No. 817,577, Jul. 21, 1977, abandoned.

[51] Int. Cl.$^3$ .................. B05C 15/00; B01D 47/00
[52] U.S. Cl. .................. 98/115 SB; 55/240; 55/DIG. 46; 261/118; 261/DIG. 54
[58] Field of Search .......... 55/84, 85, 89, 90, 93, 55/94, 240, 241, DIG. 36; 98/115 SB; 261/115, 116, 117, 118, DIG. 54, DIG. 46

[56] References Cited

U.S. PATENT DOCUMENTS

| | | | |
|---|---|---|---|
| 420,378 | 1/1890 | Dye | 261/118 |
| 487,279 | 12/1892 | Lane | 261/118 |
| 1,246,355 | 11/1917 | Thomas | 55/229 X |
| 1,312,898 | 8/1919 | Ehrhart | 261/DIG. 54 |
| 1,379,955 | 5/1921 | Bancel | 261/118 X |
| 2,152,251 | 3/1939 | Gay | 261/DIG. 54 |
| 2,180,586 | 11/1939 | Gustafsson | 98/115 SB X |
| 2,337,983 | 12/1943 | Fisher | 98/115 SB X |
| 2,385,077 | 9/1945 | Harker et al. | 55/241 X |
| 2,804,341 | 8/1957 | Bete | 239/501 |
| 3,119,675 | 1/1964 | Gallagher | 55/257 QU |
| 3,884,654 | 5/1975 | De Crevoisier et al. | 55/257 R X |
| 3,932,151 | 1/1976 | Lau | 55/241 X |

FOREIGN PATENT DOCUMENTS

| | | | |
|---|---|---|---|
| 687417 | 5/1964 | Canada | 55/284 |
| 1600094 | 2/1970 | France | 55/240 |

Primary Examiner—Albert J. Makay
Assistant Examiner—Harold Joyce
Attorney, Agent, or Firm—Gary, Juettner & Pyle

[57] ABSTRACT

Air or other gases containing contaminants or requiring treatment are moved into at least one substantially continuous sheet of treating liquid at the entrance to a streamline flow passage having a smoothly curved convex interior surface progressively decreasing in cross-sectional area in direction of flow. A nozzle mounted adjacent the entrance end of the flow passage generates one or more substantially continuous sheets of treating liquid covering the entrance to the passage. The passage has a convex throat and an exit smaller than the entrance so that the gas and treating liquid entrained therein move through the passage at an accelerating velocity with smooth, substantially unidirectional flow, and are discharged therefrom with no discernible turbulence or splashing. The gas and the treating liquid are discharged from the flow passage into an eliminator chamber of large volume, whereupon the treating liquid and any entrained contaminants drop out of and are separated from the gas. The invention is particularly adapted to paint spray booths for removal of paint overspray from the booth ventilating air prior to discharge of the air to atmosphere.

13 Claims, 7 Drawing Figures

AIR WASHER PARTICULARLY FOR PAINT SPRAY BOOTHS

CROSS-REFERENCE

This application is a continuation of application Ser. No. 155,586, filed June 2, 1980 (now abandoned), which was a division of application Ser. No. 877,005, filed Feb. 13, 1978 (now U.S. Pat. No. 4,239,512), which was a continuation-in-part of then copending application Ser. No. 817,577, filed July 21, 1977 (now abandoned).

BACKGROUND OF THE INVENTION

This invention relates to apparatus for treating gases with liquids, such as removing solid and liquid contaminants from gases, for example, for removing paint particles, fiber glass, grinding dust, enamel and porcelain frit, and the like, from air which has been moved through a working area for ventilation purposes. The invention is particularly applicable to paint spray booths, and is discussed herein in that particular context. However, it is to be understood that the invention has broad application as first above stated.

Various systems have been devised to remove contaminant material from air, one of the more common being a water wash system wherein water is flowed downwardly over an imperforate wall at the rear of a work area and across an air gap adjacent the floor of the work area, thereby providing a flow of water through which air is drawn at high velocity. Such systems, however, have not been completely effective for all contaminant material or for all particle sizes of material which are to be removed from the air.

In an attempt to increase efficiency, other systems, such as disclosed in U.S. Pat. Nos. 1,138,081 and 1,966,280, utilized a plurality of water sprays followed by a filter. Still others moved the air through water sprays followed by an intricate series of baffles which purported to separate the water and contaminants from the air, such for example as Clark et al U.S. Pat. No. 2,395,960, Gallagher U.S. Pat. No. 3,119,675 and French Pat. No. 1,192,088. These systems also proved to be less efficient than was desirable in removing contaminants and, furthermore, allowed too great an amount of moisture to remain in the air as it is exhausted to atmosphere.

Another scheme to increase efficiency was to increase the turbulence by the utilization of fine droplets or by spiraling the air flow through the water spray. Examples of this concept are shown, for example, in Hoffman et al U.S. Pat. No. 3,641,743 and McCornack U.S. Pat. No. 2,047,424.

It is believed that the inefficiency of the above-mentioned systems results from (1) utilization of large wash areas wherein the air cannot be effectively scrubbed and/or (2) utilization of sprays in the form of scattered droplets which, even under violent agitation, do not wet the contaminant particles. The particles, therefore, tend to remain in the air rather than be picked up by the water.

Attempts to solve the problem by use of restricted wash areas appear in (1) Campbell U.S. Pat. No. 2,732,909 which discloses a restricted chamber wherein the air is subjected to a violent whirling action; (2) Panzica et al U.S. Pat. No. 3,328,009 wherein the air is drawn through a restricted chamber in which water is sprayed into a rapidly rotating cage to break the water up into droplets in a pattern confined to the spray chamber; (3) Arnold U.S. Pat. No. 3,737,106 wherein a nozzle ejects water against a deflector to produce a radial spray in a cylindrical chamber; (4) Larsson et al U.S. Pat. No. 3,138,087 and Wilhelmsson et al U.S. Pat. No. 3,168,030 wherein an elongated slot is formed by converging water washed subfloors, and the water is atomized at the slot by means of a venturi formation acting on the water and paint laden air as they are discharged through the slot; (5) Gallagher U.S. Pat. Nos. 3,119,675 and 3,782,080 wherein the air is drawn through a cylindrical opening and against a baffle opposed to the outlet of the opening, the air passing through a spray of small droplets of washing liquid as it moves through the opening; (6) Fisher U.S. Pat. No. 2,337,983 wherein nozzles direct a powerful spray of water through a plurality of venturi tubes, the sprays being powerful enough to induce air flow through the tubes to pull contaminated air and fumes therethrough, and wherein vaned cones at the lower end of each tube produce a churning air washing action in the spray which is discharged into a chamber located beneath the tubes; and (7) Halls U.S. Pat. No. 3,421,293 wherein a plurality of upright tubes, mounted in a water-washed floor beneath a spray booth, are provided with vanes to produce gyratory turbulence in the air and water as they are discharged through the tubes.

While providing various advantages, these devices have not proven to be entirely satisfactory in removing contaminant particles from the air, particularly under increasingly strict standards for environmental protection.

SUMMARY OF THE INVENTION

It is well known that contaminant particles can be effectively removed from air only if the contaminant particles are properly conditioned, that is, intimately contacted and thoroughly wetted by the washing liquid, e.g. preconditioned water. In this regard, large water droplets are less efficient than small droplets. However, in all prior art devices of the type with which we are herein concerned, proper conditioning has not been attained. While decreased area and increased agitation improved efficiency to some extent, they also caused a build-up of contaminants on the walls and baffles of the washer thereby increasing the down-time for cleaning operations.

The utilization of dispersed spray droplets, even in a restricted outlet and with violent agitation of the water or air or both, permits the water and the air with its contaminant particles to move side-by-side as companions so that the particles are not completely "conditioned" or "wetted" and as a consequence are not removed from the air when the water is separated therefrom.

The principle object of the present invention is the provision of a gas treating or conditioning arrangement that will in its primary application efficiently remove contaminants from a stream of air which had been used to ventilate a working area, such as a paint spray booth or a grinding booth.

Briefly, the invention contemplates one or more restricted wash areas wherein a contaminant-laden gas is moved through at least one and preferably a plurality of substantially continuous sheets of treating or conditioning liquid at the entrance end of a streamline flow passage through which the gas and liquid mixture moves at an accelerating velocity with smooth, unidirectional flow and no appreciable or discernible turbulence.

In contrast to prior art developments utilizing restricted wash areas, the present invention does not seek to atomize the water, or to pass the contaminated air through a spray of small water droplets, or to create turbulence, or to cause agitation, or to attempt to effect the washing action solely with the liquid flowing over a water flooded floor. To the contrary, the invention takes the air from the working area and moves it through a restricted flow passage to form a column of air moving smoothly in a unidirectional, non-turbulent path of flow with accelerating velocity, the air during such formation being moved through one or more substantially continuous sheets or curtains of washing liquid where the contaminant particles in the air are intimately contacted and thoroughly wetted by the liquid.

The resultant intimately mingled column of air and washing liquid is then discharged from the flow passage into an eliminator chamber of much greater volume, whereupon the column is rapidly decelerated and dispersed outwardly of the flow passage and the liquid and the wetted contaminants drop out of and are separated from the air; the liquid and the contaminants flowing into a sump and the air, from which more than 99% of the contaminating particles have now been removed, may be exhausted to the atmosphere.

Tests have shown that the apparatus and method of this invention cleans air more effectively than prior art devices, while at the same time requiring less down time for cleaning and maintenance.

DETAILED DESCRIPTION

Figure 1:
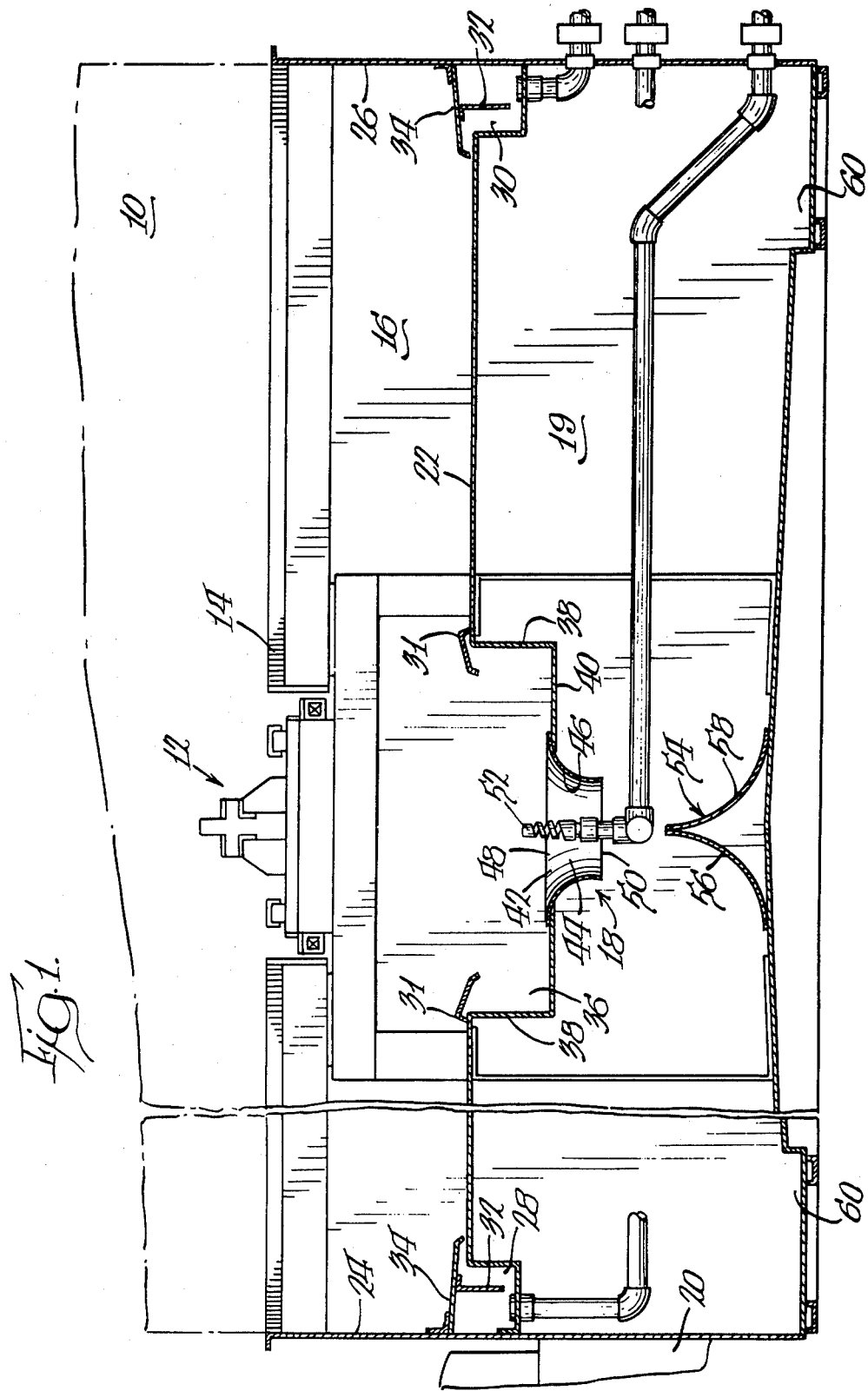
FIG. 1 is a vertical, cross-sectional view of a downdraft type of paint spray or work booth incorporating one embodiment of the air washer of this invention.

Referring to FIG. 1, articles on which work, such as painting or grinding, is to be performed are moved through a booth or enclosure indicated generally at 10 by means of a conveyor 12 extending longitudinally through the booth along the longitudinal centerline thereof. This type of booth can be used for a variety of purposes and, in particular, is used fairly extensively in the automotive industry for both automated and manual spray painting of a continuously moving line of vehicle bodies. The booth is usually equipped with fresh air inlets in the roof thereof and is designed to provide a uniform flow of ventilating air downwardly through the booth, around the vehicle bodies therein, through a perforate or grated floor, and out an exhaust system which has it entrance located below the floor grating substantially along the longitudinal centerline of the booth. The location of the entry to the exhaust system along the centerline of the booth insures uniform air flow downwardly around the vehicle bodies and rapid exhaust of the air without contamination of the roof, side walls, etc. of the booth structure by the overspray of paint inherent in spray painting operations. The general construction and additional advantages of this type of booth are described, by way of example, in previously mentioned U.S. Pat. Nos. 3,138,087; 3,168,030 and 3,421,293. In automotive body paint spray booths, such as shown in said patents, the rate of ventilating air flow, according to presently applicable standards, is in the order of 2000 cubic feet per minute (cfm) per linear foot of booth.

Referring again to FIG. 1, the floor of the booth to each side of the conveyor 12 is formed by grating 14 affording communication between the booth 10 and eliminator means, indicated generally at 16, installed below the floor. Ventilating air is drawn downwardly through the booth 10, through one or more paint eliminators or air washers 18 (which will be described in detail hereinafter), through a water eliminator or separating chamber 19, and through an exhaust duct 20 by means of an exhaust fan (not shown) installed in the exhaust duct.

Depending on the length of the particular work area involved, a plurality of air washing units 18 will be spaced at intervals along the longitudinal centerline of the booth beneath the conveyor 12. All of the ventilating air passing through the booth 10 is compelled to flow through the air washers 18 by imperforate sheets 22 which form a subfloor for the booth extending from side wall 24 to side wall 26 of the booth, and which effectively seal off all other means of egress. To prevent paint and paint overspray resulting from the spray painting operations from accumulating on this subfloor, the sheets 22 are continually flushed with or flooded by a washing liquid capable of entraining therein and carrying away any paint particles that contact the liquid on the floor. For the purpose, the sheets 22 may be inclined downwardly from their junctures with walls 24 and 26, and overflow reservoirs 28 and 30 are provided at said junctures. Washing liquid (e.g. water) is supplied to the reservoirs by suitable piping, and the liquid overflowing from the reservoirs maintains a constant, continuous sheet or layer of water on the subfloor. If desired, the subfloor sheets 22 may be substantially horizontal and provided at their inner ends with raised lips or dams 31 whereby the same form liquid containing pans from which liquid is continuously overflowed to provide the floor washing or protective action. A baffle 32 for maintaining uniform flow and a clean-out or inspection door 34 may be provided for each reservoir if desired. According to present industry standards, the amount of liquid used for flooding or washing the subfloor sheets is 10 or more gallons per minute (gpm) per side, or a total of at least 20 gpm per lineal foot of the spray booth. The present invention, when used in conjunction with liquid containing pans on the subfloor, permits the subfloor water flow to be reduced to about 10 gpm per foot, i.e. 5 gpm per side per lineal foot of booth. This liquid overflows from the pans or sheets 22 into, and serves to maintain in a clean condition, a centrally located sump 36 formed by spaced vertical walls 38 and a bottom wall 50. The liquid then flows into and is discharged through air washers 18 which are mounted in said bottom wall 40.

It is apparent, then, that all of the air which is drawn downwardly through the booth 10 can escape only through the air washers 18.

In the preferred embodiment thereof, each washer 18 comprises an air flow passage or nozzle 42 and a liquid dispensing nozzle 52. The function of the air nozzle 42 in the performance of the present invention is (1) to define an air passage of restricted area in comparison to the spray chamber 10 and the exhaust chamber 19 within which the air can be momentarily confined for effective cleaning, (2) to convert or shape the air into a column of air moving smoothly in a unidirectional, non-turbulent path of flow, and (3) to rapidly accelerate and then rapidly decelerate the air velocity. The most effective and most economical nozzle to serve these purposes, at least in my experience to date, is the streamline flow nozzle. This nozzle has a relatively large entrance end 48, a relatively small exit end 50, and a smoothly curved, convex interior surface or throat 46 between said ends, preferably comprising exactly one-quarter of a circle, i.e., a 90 degree arc of uniform radius. The entrance end may be extended tangentially a short distance to provide a mounting flange, and the exit end may be curled back on itself for edge strength and rigidity, but the basic configuration remains the same. Also, for reasons of convenience and economy I prefer that the progressively diminishing air passage thus defined be circular in cross-section. However, the important consideration is to attain at least substantially the three functions above listed, and any air passage defining means attaining these functions may prove acceptable. Consequently, and for the further purpose of distinguishing the same from the nozzle 52, the element 42 is referred to herein as a streamline flow passage or air flow passage.

The liquid nozzle 52, for the purpose of the present invention, must be capable of generating one or more substantially solid, continuous sheets of water or other washing liquid which will extend over and across and cover the entrance end of the flow passage, substantially without voids or hollows.

As stated earlier, it is believed that one of the primary reasons that prior art restricted area air washers were not entirely satisfactory is that violent agitation, turbulence, and a scattering of droplets were thought to be important but, in reality, prevented intimate mingling and wetting of the contaminant particle with the washing liquid. According to the present invention, turbulence is minimized and washing is effected by passing the air in a substantially unidirectional non-turbulent stream through one or more substantially continuous, solid sheets of washing liquid.

Figure 2:
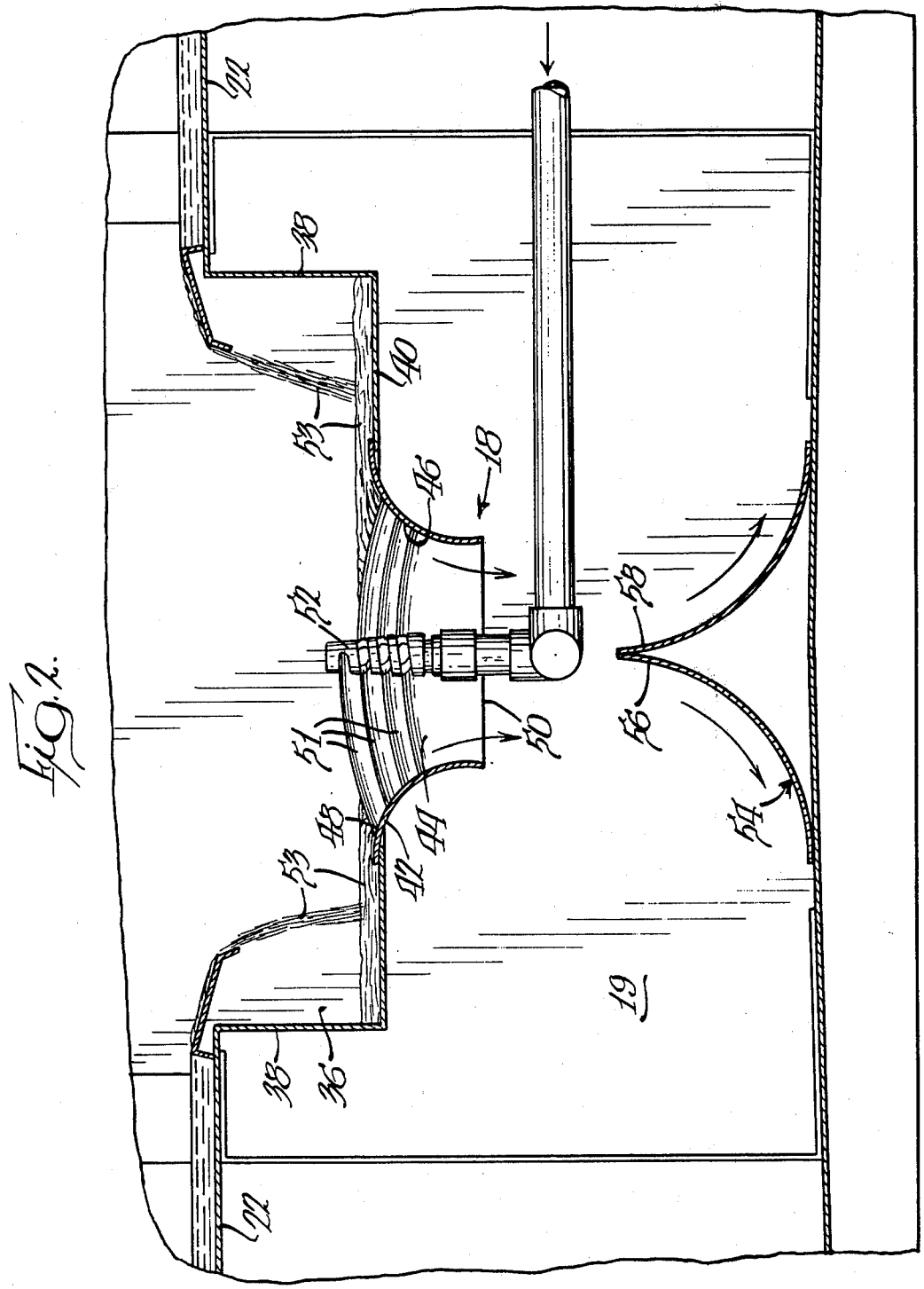
FIG. 2 is an enlarged vertical cross-sectional view of the embodiment of the air washer shown in FIG. 1, the view illustrating the formation of a plurality of sheets of washing liquid at the entrance to the flow passage.
Figure 3:
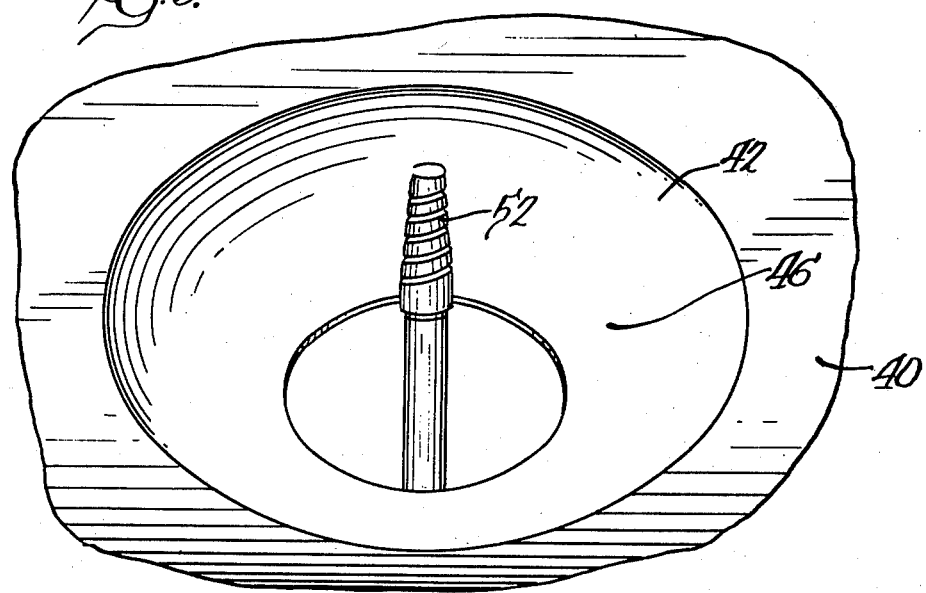
FIG. 3 is a fragmentary perspective view of the air washer from the entrance side of the flow passage.

One type of nozzle which will provide such a sheet of liquid is that described in U.S. Pat. No. 2,804,341, to Bete. As shown in FIG. 2, this nozzle comprises a tubular inlet and a helical extension on the inlet of progressively decreasing internal diameter as it spirals away from the inlet. The helical extension thus successively peels or shears layers of liquid off of the cylindrical core of liquid passing through the inlet and discharges them at an angle and in a pattern determined by the relative angle of the surface of the helix facing the entering stream of liquid. By forming these surfaces perpendicular or nearly perpendicular to the axis of the nozzle, a radially outwardly moving sheet of liquid can be formed. If the helix is comprised of a plurality of turns, a uniform spiral pattern of liquid is formed made up of a plurality of individual layers or sheets of liquid. At all points in the pattern, the liquid moves radially outward from the nozzle (the liquid does not spiral or twist), and with a full helical extension forms a 360 degree pattern of liquid emanating radially outward from the nozzle. The liquid emanates from the nozzle as a substantially continuous sheet, but if not acted upon by any extraneous force will break up into droplets or a spray at some distance from the nozzle. In practice of the present invention, sufficient liquid is supplied to the nozzle 52 at sufficient pressure through a sufficient number of helical turns to form one or more substantially continuous sheets of liquid over and across the entrance end of the flow passage 42 when the exhaust fan is on and air is passing through the sheet or sheets of liquid and the flow passage. Such nozzles having one and one-half, three and one-half, and five and one-half turns have proved satisfactory, but other numbers of turns could be utilized.

Using a nozzle 52 of the above-described characteristics, and a streamline flow passage 42 of circular cross-section, it is preferable to mount the nozzle in both radial and axial alignment with the entrance end of the flow passage as shown in FIG. 2. It is also preferable to supply washing liquid to the nozzle by means of conventional piping installed in the water separating chamber 19 and including a feed pipe extending axially into the flow chamber from the exit end thereof, the nozzle being mounted on and extending axially from the feed pipe. In this position, the nozzle discharges, in a 360 degree pattern, at least one and preferably a plurality of substantially continuous continuous sheets or layers of water which completely fill the entrance end of the flow passage, and thereby protect the flow passage, nozzle and piping from accumulation of paint. When the liquid is on and the ventilating air is off, the liquid will be discharged radially beyond the confines of the flow passage and break up into a spray. However, when the air is turned on, the liquid from the nozzle 52 is drawn into the mouth of the flow passage 42 by the air flow and forms one or more convex or umbrella shaped layers of liquid as indicated at 51 in FIGS. 2 and 4. Due to the influence of the air on the nozzle liquid, a plurality of sheets of liquid emanating radially from the nozzle may be pulled into a single sheet or layer, especially at the peripheral margin thereof, i.e., adjacent the wall of the flow passage, and this is not objectionable so long as the inlet to the flow passage is covered by at least one substantially continuous sheet of liquid as indicated at 51. In addition to the liquid 51, liquid overflowing from the subfloor 22, which is indicated at 53 in FIGS. 2 and 4, drains into the flow passage 42 for discharge through the passage. The subfloor liquid 53 flows into the passage substantially uniformly around the periphery of the same and is guided thereby into a unidirectional non-turbulent, streamline flow conforming essentially to the lines of generation of the curved surface of the passage up to the sheet of liquid 51.

Figure 4:
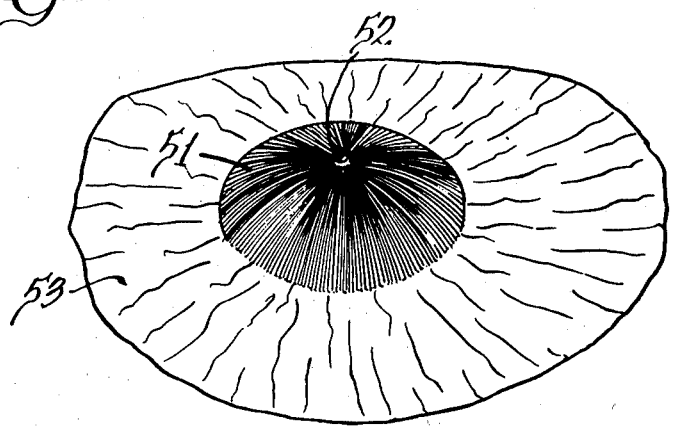
FIG. 4 is a view similar to FIG. 3, illustrating the washer as it appears in actual operation.

With the liquid nozzle operating as shown in FIGS. 2 and 4, contaminated air from the spray chamber 10 is drawn by the exhaust fan into and through one or more sheets of washing liquid at the entrance end of the flow passage 42. While the air is being drawn into the liquid from all directions in the hemispherical area overlying the umbrella 51 of liquid, the pattern of air flow is already being greatly influenced by the aerodynamic functioning of the passage 42 and the movement of air into the liquid is very smooth flowing and not discernibly turbulent. The contaminant particles in the air are intimately contacted and thoroughly wetted by the sheets of liquid, and the air, contaminant particles, nozzle liquid 51 and floor liquid 53 are drawn continuously into the flow passage during operation of the booth.

The air and liquid are drawn through the flow passage at an accelerating velocity with smooth flow and no appreciable turbulence and emerge from the flow chamber in substantially an axial direction with little, if any, radial component of movement, and no circumferential or gyratory con.ponent of movement. The air-liquid mixture is discharged from the flow passage in a very uniform, unidirectional pattern, with no voids, holes or channels in the pattern, illustrating the intimate mingling of the air and liquid in the passage. This combination of a substantially continuous sheet of washing liquid and streamlined, smooth accelerating flow intimately mingles the air and liquid so that virtually all of the contaminant particles are "wetted" and thereby "conditioned" for removal from the air. Upon exit from the flow passage, the air is rapidly decelerated and dispersed into the large volumetric capacity of the separating chamber 19, whereupon the liquid and the wetted contaminant particles, being heavier than the air and no longer sustained by a high velocity air flow, drop out of and are separated from the air.

Because prior art air washers did not adequately condition or wet the contaminant particles in the air stream, it was necessary to eject the air-liquid mixture forcefully against a pool of water or against a deflector, baffle, or series of baffles in order to increase the wetting and/or knock particulate matter out of the air by repeated reversal of the path of air flow and/or use of a serpentine path of air flow. In the arrangement described herein, conditioning is so complete that such deflectors are not necessary. In fact, the washing liquid, together with the contaminant particles, will drop out of the air stream if sufficient space is available in the separating chamber 19, and particularly if the floor of the chamber can be spaced sufficiently below the exit end of the flow passage to permit dissipation of the jet of air and water issuing from the passage. However, in some down-flow installations, adequate space may not be available. In such instance, a sweep sheet 54 may be positioned directly beneath the flow chamber to aid in the separation of liquid and air. The sweep sheet 54 may be circular in horizontal cross-section and generally conical in vertical cross-section except that the outer surface is concave. Alternately, the sweep sheet 54 may comprise opposed generally rectangular sheets 56 and 58, extending longitudinally beneath the air washers 18, but bent into the concave contour seen in FIG. 1. A deflector in the form of a flat sheet, or sheets, rather than concave, may be utilized if desired, but smoother flow of the washing liquid is attained by means of the preferred concave flow sheet. As the air-liquid mixture emerges from the air washer, the liquid impinges against sweep sheet 54 and flows smoothly down its concave surfaces and into drainage means in the form preferably of large, unobstructed, free flowing sluices or waterways 60. The liquid may be collected in a sump (not shown), treated, and recirculated if so desired.

In use of the booth shown in FIG. 1 for spray painting of automotive vehicle bodies, with an air flow requirement of 2000 cfm per lineal foot of the booth, and with the air washers 18 mounted for vertical downward flow, I prefer to mount the air washers 18 on two and one-half foot centers along the longitudinal centerline of the booth. This places the washers sufficiently close together to insure uniform flow of ventilating air through the spray painting chamber 10, and imposes a reasonable air load factor of 5000 cfm on each washer, without undue multiplication of the washers. The size of each washer may be varied depending on a large number of variables that enter into the design, as will be discussed later herein, but in the preferred embodiment, using streamline flow passages of circular cross-section, the air flow passages may be designed to have a minimum inner diameter, i.e., at the exit end thereof, in the range of about nine to twenty-four inches, which dimensions are representative and not intended to be limiting. The length of the flow passage axially thereof is preferably in the order of about one-half of the exit diameter.

The nozzle 52 may be varied in size and design depending upon the characteristics of the other variables to be discussed later herein, but particularly the shape and size of the air flow passage, the nature of the washing liquid, and the volume and pressure at which the liquid is supplied to the nozzle. In the preferred embodiment now under discussion, the volume of liquid may successfully be varied in the range of about 75 to 150 gpm, and the pressure in the range of about 3 to 15 psi. Generally, the pressure is inversely proportional to the volume, i.e., higher pressures being employed at lower volumes and vice versa, so as to insure the presence of a substantially continuous sheet of liquid over the entrance end of the flow passage. Also, in the FIG. 1 embodiment, constant movement of washing liquid from the subfloor 22 over the wall 40 of the sump 36 and into the flow passages permits decrease in the volume of liquid required at the nozzle 52 since the subfloor liquid 53 will keep the entrance end portion of the flow passage clean and thereby permit the umbrella of liquid 51 from the nozzle 52 to be located further down into the passage where the diameter is smaller and the volume of liquid required to form the sheet is less.

Another factor having marked influence on the washer design is the capacity of the exhaust system and fan. An exhaust system capable of inducing a high air pressure drop across the washer permits more efficient utilization of the invention than one capable of inducing a low pressure drop. However, lower pressure requires less horsepower for the fan and may therefore be preferred in some instances. This variable is generally referred to as the static pressure of the booth and is conventionally measured in inches of height of a column wc.

For the above-described preferred embodiment of the washer, handling 5000 cfm of contaminated air and using chemically treated water as the washing medium, representative specifications for successful washers are as follows:

A.
   Static Pressure: 5" wc
   Flow Passage Diameter: 14" Min. I.D.
   Subfloor Liquid: 0–25 or more gpm
   Nozzle Liquid: 150 gpm
   Nozzle Pressure: 4 psi
   Nozzle Turns: 3-½

B.
   Static Pressure: 5" wc
   Flow Passage Diameter: 14" Min. I.D.
   Subfloor Liquid: 25 gpm*

Nozzle Liquid: 100 gpm
Nozzle Pressure: 12 psi
Nozzle Turns: 3-½

*5 gpm per side per lineal foot averages out to 25 gpm per air washer at 2¼' centers.

C.

Static Pressure: 3½" wc
Flow Passage Diameter: 17" Min. I.D.
Subfloor Liquid: 0–25 or more gpm
Nozzle Liquid: 150 gpm
Nozzle Pressure: 4 psi
Nozzle Turns: 5½

In Example C., more turns were required on the nozzle helix to insure the existence of at least one substantially continuous sheet of water over the entrance end of the larger diameter flow passage. Example A. constitutes the most efficient one of the three designs in terms of effectiveness of air cleaning. Example B utilizes subfloor liquid to wash the large diameter end of the flow passage, and thereby permits use of less liquid at the nozzle. In Example B, possibly at the cost of somewhat higher liquid pressures, the nozzle liquid could feasibly be reduced to 75–80 gpm. In Examples A and C, subfloor liquid could be present but is not essential. In any case, subfloor liquid does not produce any disadvantageous consequences.

It is to be appreciated that the above specifications are given by way of example as being representative of practical species of the preferred embodiment of the air washer of the invention, and are not in any way intended to be limiting.

A further advantage of the air washer of the invention, not enjoyed by much of the prior art, resides in the fact that the washer may be installed in any regular position desired, i.e., vertically downward, vertically upward, or any position in between; in fact, along any radius of a sphere having a point on the axis of the flow passage as its center. In FIG. 1, the flow passage is vertically downward, in FIG. 5 (about to be described) essentially vertically upward, and in FIGS. 6 and 7 (later to be described) essentially horizontal. The washer itself, comprised of the flow passage 42 and nozzle 52, is self-contained and non-reliant for its operation on extraneous factors, such as gravity. Therefore, it can be used whenever desired.

Figure 5:
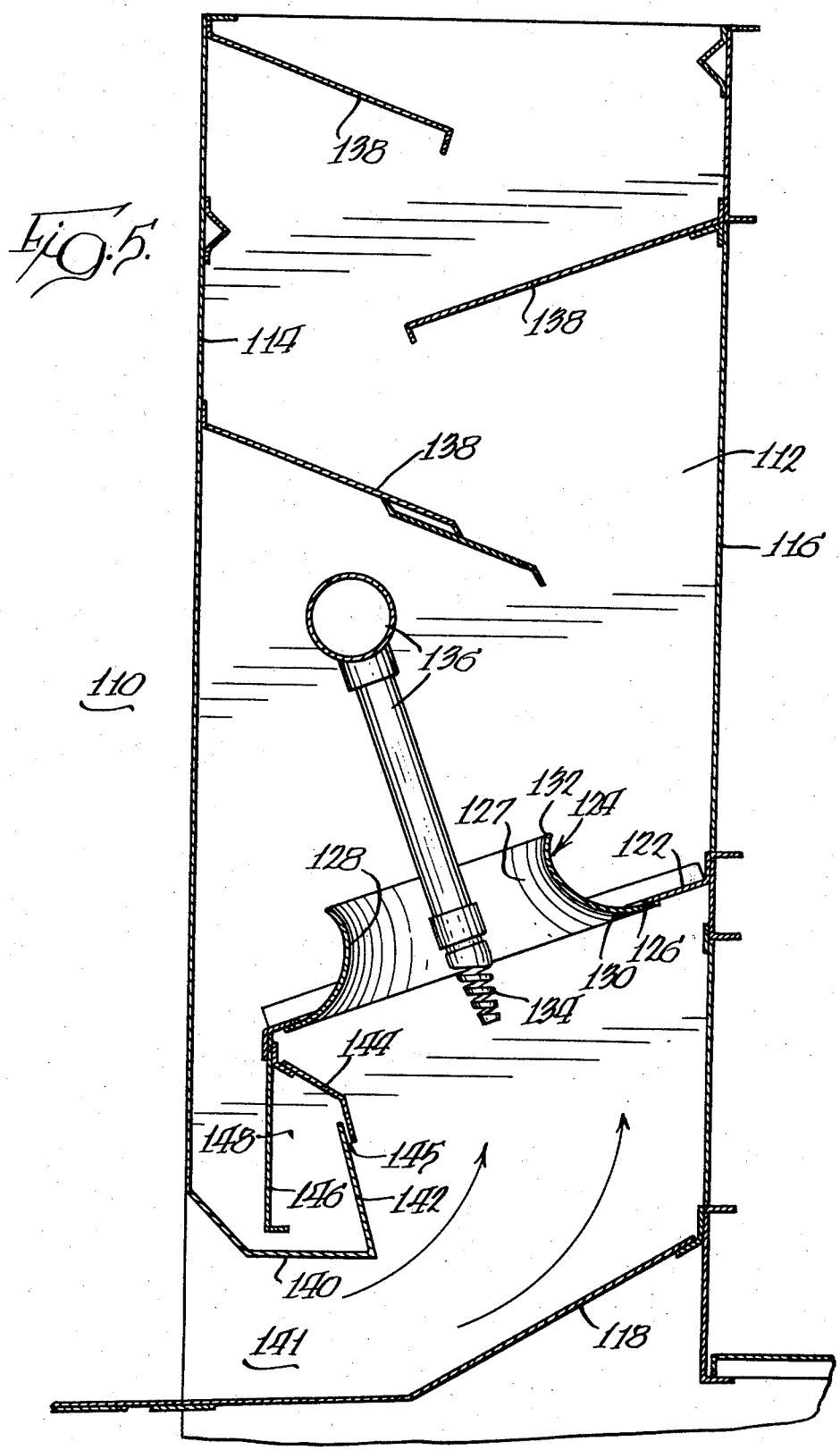
FIG. 5 is a fragmentary vertical cross-sectional view of a side- or up-draft type of spray paint or work booth incorporating the air washer of the invention.

Referring now to FIG. 5, the air washer of the invention is shown installed for use in an updraft type of exhaust chamber for paint spray booths, which chamber as known in the art may be used in connection with downdraft, sidedraft and/or updraft booths. In FIG. 5, the spray booth is shown fragmentarily and indicated at 110. Extending longitudinally of the spray booth for the full length thereof is an exhaust chamber or eliminator section 112 formed by a wall 114 of the booth 110 and an outer wall 116. A drain sheet 118 forms the bottom of chamber 112.

Positioned in the lower portion of chamber 112 but spaced from drain sheet 118 is a mounting plate 122 which extends the full length of the exhaust chamber. The outer edge of plate 122 is secured to wall 116 while the inner edge is spaced slightly from wall 114 for a purpose to be explained hereinafter. The plate 122 may be positioned horizontally or may, preferably, slope downwardly at a preferred angle of about 20 degrees as shown in FIG. 5.

A plurality of longitudinally spaced air washers 124 are mounted on the upper side of plate 122, i.e., downstream thereof in the direction of air flow, directly over openings 126 formed in the plate. The air washers shown in FIG. 5 are identical with the air washers of FIGS. 1–4 and each include a flow passage 127 having a convexly curved, streamlined throat portion 128, a relatively large entrance end 130, and a relatively small exit or discharge end 132. A washing liquid nozzle 134 is positioned axially of the flow passage and generally radially aligned with the entrance end thereof, to provide one or more generally radially extending, substantially continuous, sheets of water or other washing liquid over and across the entrance end of the flow chamber, the nozzle being supplied by suitable piping 136 including a header extending longitudinally through the exhaust chamber 112 and a feed pipe extending axially into the flow passage from the exit end thereof.

A plurality of staggered baffles 138 may be provided above the air washers to aid in eliminating water vapor from the air prior to its discharge from the exhaust chamber.

In order to accommodate flow of air from booth 110 into exhaust chamber 112, the wall 114 is provided with a generally horizontally extending leg portion 140 spaced a short distance above drain sheet 118 to form a passageway 141 affording communication between the lower end of the booth and the exhaust chamber. The leg portion 140 has an upwardly extending wall 142 at the upper end of which is spaced slightly from a wall 144 depending from the inner end of mounting plate 122, thereby forming an elongated longitudinal slot 145. A central leg 146 extends downwardly from plate 122 but terminates above the leg portion 140. When the spray booth and air washers are operating, washing liquid will accumulate in a reservoir 148 formed by walls 114, 140 and 142; the liquid accumulating up to the top edge of wall 142 and then flowing through the slot 145, down wall 142, across the opening 141 and onto drain sheet 118, thereby forming a descending sheet or curtain of washing liquid through which the paint laden air must pass on its way to the washers. The construction of the reservoir 148 thus provides (1) a path of egress for the washing liquid discharged through the nozzle 134 and flow passage 127 into the lower end portion of the exhaust chamber 112, (2) a liquid seal for said path of egress preventing paint laden air from bypassing the washers, (3) means for pre-wetting or preconditioning the paint particles in the air, (4) a source of supply of washing liquid that will be carried with the air into the space below the washer mounting plate 122 to wet the surfaces of the structural elements that define said space and thereby keep them clean, and (5) a source of supply of washing liquid for the drain sheet 118 and the booth subfloor to which the drain sheet leads.

In operation, one or more exhaust fans (not shown) at the upper end of exhaust chamber 112, draws air from the booth, through the water curtain falling from plate 142, through the substantially radial sheet or sheets of water formed by the nozzle 134, and thence upwardly through the flow passage 127 at an accelerating velocity with smooth, unidirectional flow and no appreciable turbulence or radial or gyratory component of movement. The air and liquid exit axially upwardly from the flow passage into the chamber 112, which is of large volumetric capacity in comparison to the flow passage, whereupon the air velocity is rapidly decreased and the air expanded or dispersed, so that the liquid and wetted contaminant particles drop out of and are separated from the air. The jet or air-liquid mixture may if desired strike the lowermost baffle 138, but such is not essential to the operation of the washer. The liquid with the contaminant particles entrained therein then flows along plate 122 into the reservoir 148, and thence through slot 145 for the purposes above described. The air, from which substantially all contaminants have now been removed, moves up the exhaust chamber past succeeding baffles 138, which serve to remove the last traces of moisture from the clean air. Thus, only clean, dry air is exhausted from the chamber 112.

Suitable design specifications for the type of booth shown in FIG. 5 are represented by Examples A and C previously described. Larger volumes of washing liquid at the nozzles 134 are preferred in this embodiment to insure wetting of the entirety of the entrance ends of the flow passages, inasmuch as there is no subfloor liquid to aid in performance of this function, and also to provide ample washing liquid for performance of the functions described in connection with the reservoir 148.

Figure 6:
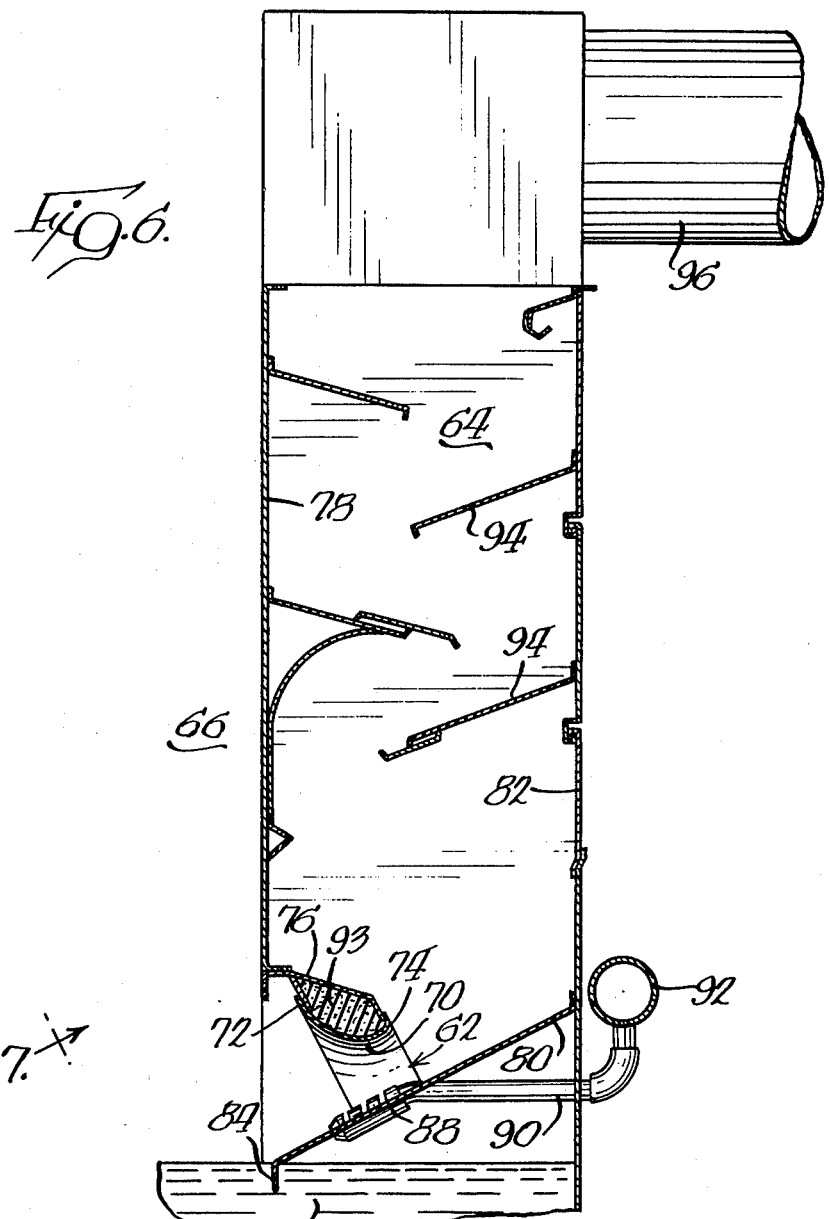
FIG. 6 is a vertical cross-sectional view of an alternate embodiment of the air washer especially adapted for conversion and improvement of existing paint epoxy spray and work booths.
Figure 7:
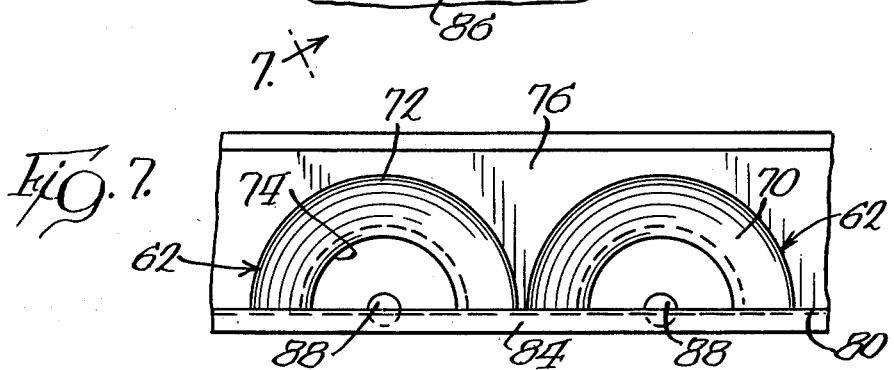
FIG. 7 is a front elevational view of the air washer of FIG. 6, the view being taken substantially on line 7—7 of FIG. 6.

While the flow chamber in the preferred embodiment of the invention, as shown in FIGS. 1 through 5, is of circular cross-section, and the nozzle discharges washing liquid in a full 360 degree pattern, the desired separation of contaminants from the air may be achieved by use of various modifications, such for example, as the partially circular washer embodiment shown in FIGS. 6 and 7. In this embodiment, a plurality of air washers 62 are mounted in longitudinally spaced relationship along an exhaust chamber or eliminator 64 and are positioned at the lower end thereof, the exhaust chamber forming part of a spray booth 66 positioned adjacent the exhaust chamber and shown only fragmentarily.

Air mixed with paint spray or other contaminants is drawn from the booth 66 by means of an exhaust fan (not shown) located at the upper portion of the exhaust chamber 64, through the air washers 62. These washers are essentially the same as those described heretofore except that, as best seen in FIG. 6, they are semi-circular in radial cross-section, thereby forming half sections of 180 degrees instead of full circular sections as in the preferred embodiment.

Each washer 62 includes a flow passage comprising a convexly curved inner throat surface 70, a relatively large entrance end 72 and a smaller exit or discharge end 74. In essence, the passage is a half-section of the earlier described flow passage, and a plurality of such passages are spaced longitudinally along and mounted in any convenient manner on a longitudinally extending shield plate 76 and an associated inclined drain sheet 80. Preferably, the flat ends of each flow passage are secured to the drain sheet 80 so that said sheet forms the remaining wall of the washer. The arcuate wall of the flow passage is then secured within a semi-circular cutout in the shield plate 76. As seen in FIG. 6, the space between the concave outer periphery of the flow passage and the shield 76 may be filled with foam 93, such as for example as polyurethane, to act as a sealant. The shield plate then in turn is secured to the lower edge of the wall 78 of the spray booth, and the drain sheet 80 is secured to the exterior wall 82 of exhaust chamber 64. The drain sheet extends angularly downward and a vertical extension 84 at its inner end is immersed in the liquid in a sump or reservoir 86 to form a liquid seal causing the air to move into and through the washers.

A liquid nozzle 88, having certain characteristics in common with the previously described nozzle, is mounted on the drain sheet 80 substantially in radial alignment with the entrance end 72 of each flow passage. Washing liquid is supplied to each nozzle by a feed pipe 90 connected to a water supply header 92 extending parallel to the exhaust chamber longitudinally thereof.

The nozzle 88 in this embodiment of the invention is required to discharge one or more sheets or layers of washing liquid in a 180 degree arc, thereby fully to cover the entrance end 72 of the flow passage. For the purpose, the nozzle preferably comprises a tubular inlet for connection to the pipe 90, an imperforate base portion secured to or integral with the inlet, and one or more spaced parallel arches mounted on the base and defining therebetween arcuate slots or openings of 180 degrees or slightly greater arcuate extent. Each successive arch in the direction away from the inlet has a somewhat smaller inner diameter than the preceding arch, whereby to shear a layer of liquid off of the incoming column of liquid. The surfaces of the arches facing toward the inlet are preferably perpendicular to the axis of the nozzle so as to shear off and discharge a layer or sheet of liquid in a 180 degree arc radially from the nozzle, thereby to fill the entrance end of the air passage with one or more spaced parallel sheets of liquid.

This concept of nozzle design, which provides spaced, parallel, substantially continuous, sheets of liquid, may also be used for nozzles having, by way of example, arcuate flow patterns anywhere from a few degrees up to 330–340 degrees. For a 360 degree pattern, spaced parallel annular rings would be mounted on a central rod by means of radial legs or spiders, and the rod would be provided at its outer end with a radial flange to discharge the final sheet of liquid.

The 180 degree flow passages and associated nozzles shown in FIGS. 6 and 7 accommodate flow of contaminated air and washing liquid therethrough at an accelerating velocity with smooth, unidirectional flow with no appreciable turbulence in much the same manner as the 360 degree flow passages shown in FIGS. 1 through 5.

The intimately mingled air and liquid move smoothly through the flow chambers where the contaminant particles in the air are thoroughly "wetted" or "conditioned" for removal from the air. The contaminants are retained in the liquid which, upon emerging from the flow passages and entering the exhaust chamber 64, falls back onto the drain sheet 80 and thence flows along the sheet, through the flow chambers and into the sump 86. Alternatively, liquid discharge openings could be provided in the drain sheet 80 in the spaces between the flow passages, or an overflow reservoir similar to 148 could be provided, thereby to drain the liquid if the air flow is such as to carry with it all of the water in the flow passages. The clean air, meanwhile, is drawn upwardly through the exhaust chamber 64, striking sequential baffles 94, whereby only clean, dry air is discharged from the exhaust duct 96.

The FIGS. 6-7 embodiment of the invention is particularly designed for conversion of existing spray booths to equip the same with the air washer of the invention. The exhaust chamber 64 shown in FIG. 6 is of a conventional design widely used in industry and known as the Fischer eliminator section. Because of the need to minimize change in conversion operations, and because of the space limitations thereby imposed upon the washer installation, half-section washers were decided upon as an appropriate, compromise resolution. Individual units of relatively short longitudinal extent and comprised of one or more flow passages, a section of shield plate 76 and a corresponding section of drain sheet 80, together with the associated nozzle or nozzles, can be made up to facilitate the conversion.

In effecting a conversion, it is only necessary to remove existing washer nozzles from the chamber 64, insert the individual conversion units in the booth in longitudinally contiguous relationship, bolt or otherwise secure the shield 76 to the booth wall 78 and the drain sheet 80 to the chamber wall 82, and connect the nozzles 88 to the existing header 92. Thus, an existing booth is conveniently and economically converted to a booth in accordance with the invention.

As shown in FIG. 6 and as previously mentioned, the flow passages may be mounted essentially horizontally without diminishing the effectiveness of the assembly in removing contaminant particles from the air and exhausting only clean, dry air from the booth. In a booth of the type intended for conversion in accord with the above description, it is conventional to have an exhaust chamber 64 on each side of the booth. Thus, the design specifications set forth hereinbefore for Examples A and C are generally applicable to the embodiment of FIGS. 6–7, with the exception that air and liquid flow through each washer would be approximately halved.

The washing liquid customarily employed in so-called water wash booths comprises water compounded with one or more chemicals to reduce its surface tension, to enhance its wetting action, to cause the accumulated paint particles to float or sink as desired, to inhibit growth of bacteria in systems wherein the water is recirculated, etc. Generally, such compounded water would constitute the washing liquid used in connection with the air washer of this invention, the water being discharged from the booth, preferably via large, unobstructed, free-flowing sluices or waterways, to a so-called sludge farm where the contaminants are separated from the liquid and the liquid recirculated to the liquid nozzle and, if present, the water-flooded subfloor 22.

With an appropriate recovery and reclamation system such as described, wherein all of the washing liquid is salvaged and recirculated, the present invention facilitates and contemplates the use of more sophisticated washing liquids, in particular oil and/or a mixture of water and water miscible oil. The use of oil as an air washing medium in paint spray booths has previously been proposed, for example in Saunders et al U.S. Pat. No. 2,086,514 and Lau U.S. Pat. No. 3,932,151. As explained in the latter patent, the chemicals used to formulate conventional washing liquids for water wash booths are such as to "kill" or render useless the paint particles removed from the air and collected in the wash medium. Oil on the other hand does not require any such compounding, and is entirely compatible with and readily wets any paint particles that may be entrained therein. Thus oil, such as the mineral oil recommended by Lau, serves as an excellent air washing medium and a carrier from which paint solids can be recovered and reprocessed after the oil has been expressed therefrom.

Oil on the other hand is extremely difficult to handle in the environment of large volumes of high velocity air flow such as encountered in a spray booth, and the Lau patent was heavily concerned with the problems of maintaining a continuous flow of oil on the baffle surfaces through which the paint-laden air was to be moved.

The washer structure of the present invention is ideally suited to the use of oil as the washing liquid. The liquid nozzles described are as equally capable of forming one or more continuous sheets of oil as they are of forming sheets of compounded water. Thus, the present invention facilitates the use of oil as a washing medium, with the attendant advantages of potential recovery and reuse of the paint solids removed from the booth ventilating air, and elimination of a source of corrosion. A further advantage of this invention is the potential for use as the washing medium of water compounded or mixed with water miscible oil, thereby to attain the advantages of oil and mitigate the disadvantages of conventional compounded water, without incurring the expense attendant upon the use of oil alone.

In light of the foregoing description, and bearing in mind the practices and standards of the industry, there are a large number of variables that enter into the design of any given embodiment of the invention, among which are: (1) the gaseous medium to be treated or conditioned, (2) the contaminants, to if any be removed from the gas, (3) the volume of gas to be handled, (4) the number and spacing of the flow passages, (5) the size and shape of the flow passages, (6) the static pressure across the passages, (7) the liquid to be used as the treating or conditioning medium, (8) the liquid volume, (9) the liquid pressure, (10) the size and design of the liquid nozzles, (11) the angular disposition of the device, and (12) the presence or absence of useable liquid in addition to that discharged from the liquid nozzle. All of these factors enter into and must be considered in the design of the device. While representative or exemplary specifications for the herein described preferred embodiments of the invention, as designed for a particular purpose under specified conditions, have been set forth hereinbefore, these have been given only by way of example and untold variations appear to be available.

Thus, while certain embodiments of the invention, preferred for a particular purpose, have been illustrated and described herein, it is to be understood that various changes, modifications and rearrangements may be made therein without departing from the scope of the invention, as defined by the appended claims.

What is claimed is:

1. In an apparatus for conditioning a gas with a liquid by moving the gas through a flow passage independent of interaction of liquid therewith and introducing the liquid into the flow passage through a nozzle, the improvement comprising: a streamlined flow passage having a relatively large inlet end and a relatively small outlet end and a smoothly curved convex interior surface progressively decreasing in cross-sectional area from its inlet end to its outlet end, and liquid sheet forming nozzle means positioned axially of said flow passage at and within the inlet end of said flow passage for forming at least one substantially continuous sheet of liquid emanating from the axis of said flow passage substantially perpendicular to said axis and covering the entrance to said flow passage, whereby liquid and gas are smoothly and rapidly accelerated between said inlet and outlet ends of said streamline flow passage.

2. Apparatus according to claim 1, wherein said flow passage comprises a segment of a circle in cross-section, and said nozzle means is formed to discharge a sheet of washing liquid radially therefrom in a continuous arcuate pattern at least equal to the arcuate extent of said flow passage.

3. Apparatus according to claim 1, said nozzle means comprising a nozzle substantially aligned with, at and within the entrance end of said flow passage both radially and axially thereof, said nozzle being formed to discharge at least one radially outwardly moving continuous sheet of liquid across the entrance end of the flow passage.

4. Apparatus according to claim 1, wherein the length of the flow passage, in the direction of flow, is equal to approximately one-half the size of the discharge end.

5. In an apparatus for conditioning a gas with a liquid by moving the gas through a flow passage and introducing the liquid into the flow passage through a nozzle, the improvement comprising: a streamlined flow passage having a relatively large inlet end and a relatively small outlet end and a smoothly curved convex interior surface progressively decreasing in cross-sectional area from its inlet end to its outlet end, and liquid sheet forming nozzle means positioned axially of said flow passage at the inlet end of said flow passage for forming at least one substantially continuous sheet of liquid emanating from the axis of said flow passage substantially perpendicular to said axis and covering the entrance to said flow passage, wherein said flow passage comprises a segment of a circle in cross-section, and said nozzle means is formed to discharge a sheet of washing liquid radially therefrom in a continuous arcuate pattern at least equal to the arcuate extent of said flow passage, and wherein said nozzle means comprises an inlet and a plurality of spaced parallel arcuate elements connected to said inlet axially thereof, said elements being of an arcuate extent at least equal to that of said flow passage, said elements being of progressively decreasing internal dimension in the direction from said inlet and having the surfaces thereof facing said inlet extending substantially perpendicular to the axis thereof.

6. In a paint spray booth having a paint spray chamber and an exhaust chamber, means for moving ventilating air into and through the spray chamber and out through the exhaust chamber, and means between said chambers in the path of air flow for removing paint overspray from the air, including at least one air flow passage of relatively small size in comparison to said chambers interposed between said chambers, and nozzle means in the passage for introducing washing liquid into the passage; the improvement wherein the air flow passage comprises a streamline air nozzle having a relatively large inlet end, a relatively small outlet end and a smoothly curved convex interior surface progressively decreasing in cross-sectional area from its inlet end to its outlet end, and the nozzle means comprises a liquid nozzle at and within the inlet end of the air nozzle and substantially aligned with the inlet end of the air nozzle both laterally and axially thereof and formed to discharge over the inlet end to the air nozzle at least one radially outwardly moving continuous sheet of washing liquid, whereby air and washing liquid are smoothly and rapidly accelerated between said inlet and outlet ends of said streamline air nozzle.

7. In a paint spray booth as set forth to claim 6, said air nozzle being of at least partially-circular section and having a smoothly curved convex interior surface over the circular portion thereof, said liquid nozzle being substantially aligned with the entrance end of the circular portion of the air nozzle both radially and axially thereof and formed to discharge over the entrance to the air nozzle at least one radially outwardly moving continuous sheet of washing liquid in an arcuate pattern at least equal to the arcuate extent of the air nozzle.

8. In a paint spray booth as set forth in claim 6, the spray chamber having an outlet leading generally laterally to the entry to the exhaust chamber, said air nozzle being located in the entry portion of the exhaust chamber above said spray chamber outlet and spaced above a floor means of the booth, a reservoir in the entry portion of the exhaust chamber below said air nozzle for receiving the liquid discharged into the exhaust chamber from said air nozzle, said reservoir having an outlet for flowing the liquid into the entry portion of the exhaust chamber upstream of said air nozzle and onto the floor means of the booth.

9. In a paint spray booth as set forth in claim 8, said reservoir being located above the outlet from the spray chamber and said outlet from said reservoir comprising an overflow dam for cascading a curtain of liquid downwardly across the spray chamber outlet and onto a floor means of the booth, air passing through the spray chamber outlet moving through said curtain of liquid and carrying some of the liquid with it to provide a liquid wash for the entry portion of the exhaust chamber upstream from said air passage, the remainder of the liquid from said curtain providing a liquid wash for the floor means of the booth, said overflow dam providing a liquid seal preventing the air from bypassing said flow passage.

10. In a paint spray booth as set forth in claim 6 having a washing liquid collection and recirculation system associated therewith, the further improvement wherein the washing liquid comprises oil.

11. The improvement set forth in claim 10, wherein the washing liquid is a mixture of water and water miscible oil.

12. In a paint spray booth as set forth in claim 6, the length of said air nozzle being less than the dimension of the air nozzle outlet end.

13. In a paint spray booth as set forth in claim 7, the length of said air nozzle being approximately equal to the radius of the circular portion of the air nozzle at its outlet end.

* * * * *